United States Patent
Hashimoto

(10) Patent No.: US 11,726,483 B2
(45) Date of Patent: Aug. 15, 2023

(54) APPARATUS FOR DETECTING INCLINATION ANGLE AND CONTROLLER

(71) Applicant: TOYOTA JIDOSHA KABUSHIKI KAISHA, Toyota (JP)

(72) Inventor: Daisuke Hashimoto, Chofu (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 236 days.

(21) Appl. No.: 17/220,082

(22) Filed: Apr. 1, 2021

(65) Prior Publication Data
US 2021/0309218 A1  Oct. 7, 2021

(30) Foreign Application Priority Data

Apr. 6, 2020  (JP) .................................. 2020-068689

(51) Int. Cl.
*G05D 1/00* (2006.01)
*G05D 1/02* (2020.01)
(Continued)

(52) U.S. Cl.
CPC ........... *G05D 1/0212* (2013.01); *B60W 30/09* (2013.01); *B60W 30/0956* (2013.01);
(Continued)

(58) Field of Classification Search
CPC .. G05D 1/0212; G05D 1/0214; G05D 1/0238; G06V 20/58; G06V 10/454;
(Continued)

(56) References Cited

U.S. PATENT DOCUMENTS

| 2017/0162055 | A1 | 6/2017 | Lehner | |
| 2018/0218229 | A1* | 8/2018 | Murillo Amaya | ..... B60Q 1/143 |
| 2019/0294881 | A1* | 9/2019 | Polak | ....................... G06N 3/04 |

FOREIGN PATENT DOCUMENTS

| JP | 2017102928 A | 6/2017 |
| JP | 2017185862 A | 10/2017 |

OTHER PUBLICATIONS

Chung-Cheng Chiu, Min-Yu Ku, Hung-Tsung Chen, "Motorcycle Detection and Tracking System with Occlusion Segmentation," 2007, IEEE, Eighth International Workshop on Image Analysis for Multimedia Interactive Services, whole document. (Year: 2007).*

* cited by examiner

*Primary Examiner* — Tyler J Lee
*Assistant Examiner* — Tiffany P Ohman
(74) *Attorney, Agent, or Firm* — Dickinson Wright, PLLC

(57) ABSTRACT

An apparatus for detecting an inclination angle includes a processor configured to input an image generated by a camera into a first classifier that has been trained to detect a two-wheeler, thereby detecting an object region including the two-wheeler in the image; rotate the object region by predetermined different angles to define characteristic regions as respective rotated regions; cut out the characteristic regions from the image; and detect a width of the two-wheeler in each of the characteristic regions and detects a rotation angle relative to the image as the inclination angle of the two-wheeler to the normal of the ground, based on rotation angles of the respective characteristic regions relative to the image and widths of the two-wheeler in the respective characteristic regions, the rotation angle minimizing the width of the two-wheeler.

4 Claims, 9 Drawing Sheets

(51) Int. Cl.
*B60W 50/00* (2006.01)
*B60W 40/12* (2012.01)
*B60W 30/09* (2012.01)
*G06T 7/20* (2017.01)
*B60W 30/095* (2012.01)
*G06V 20/58* (2022.01)
*G06V 20/56* (2022.01)
*G06F 18/20* (2023.01)
*G06F 18/214* (2023.01)
*G06V 10/82* (2022.01)
*G06V 10/44* (2022.01)

(52) U.S. Cl.
CPC ........ *B60W 40/12* (2013.01); *B60W 50/0097* (2013.01); *G05D 1/0214* (2013.01); *G05D 1/0238* (2013.01); *G06F 18/2148* (2023.01); *G06F 18/285* (2023.01); *G06T 7/20* (2013.01); *G06V 10/454* (2022.01); *G06V 10/82* (2022.01); *G06V 20/58* (2022.01); *G06V 20/588* (2022.01); *B60W 2420/42* (2013.01); *B60W 2520/00* (2013.01); *G06T 2207/30241* (2013.01); *G06T 2207/30252* (2013.01)

(58) Field of Classification Search
CPC .. G06V 10/82; G06V 20/588; G06F 18/2148; G06F 18/285; B60W 30/09; B60W 30/0956; B60W 40/12; B60W 50/0097; B60W 2420/42; B60W 2520/00; G06T 7/20; G06T 2207/30241; G06T 2207/30252
USPC ........................................................ 701/117
See application file for complete search history.

FIG. 6
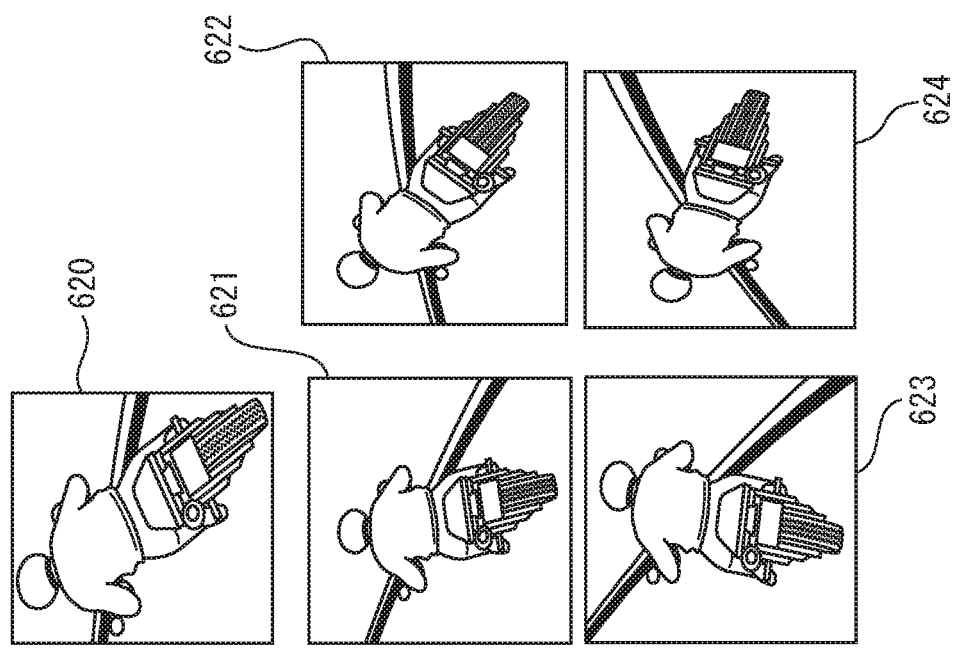
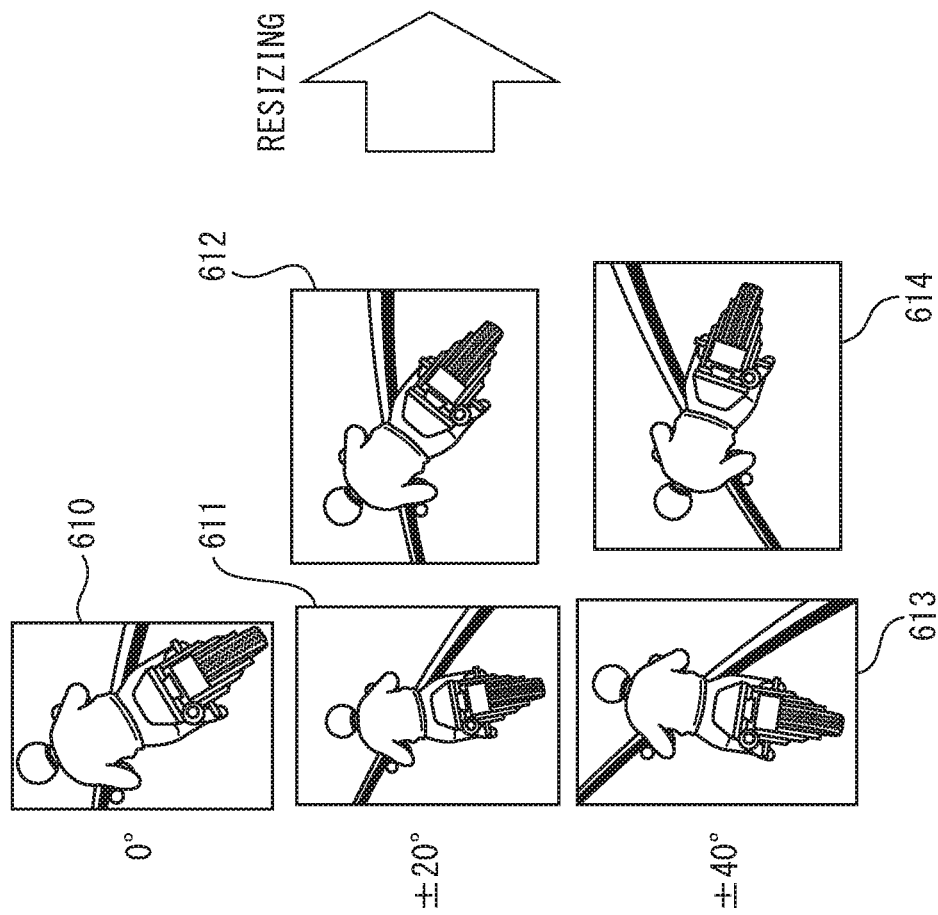

xLeftNormalized
xRightNormalized

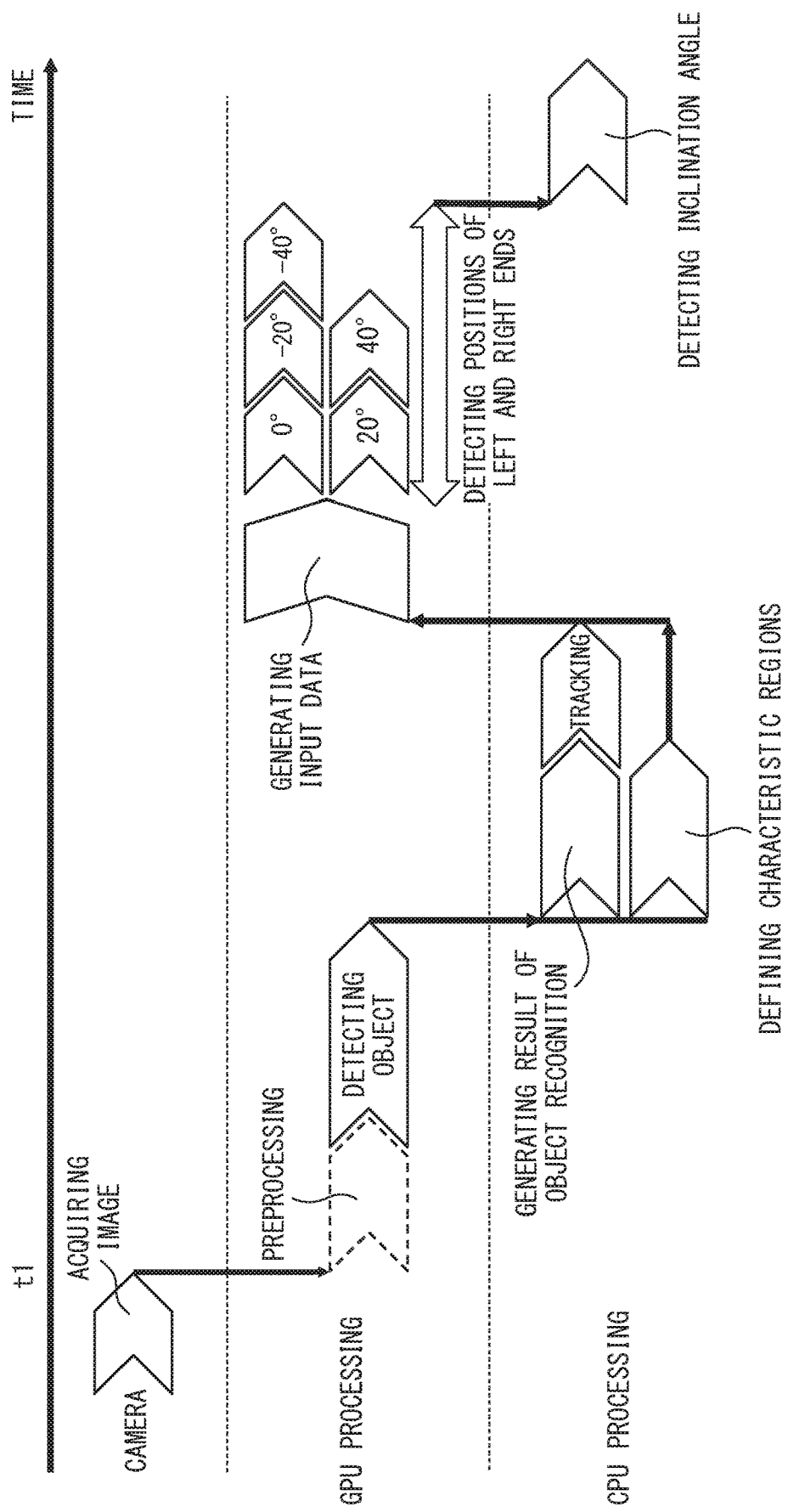

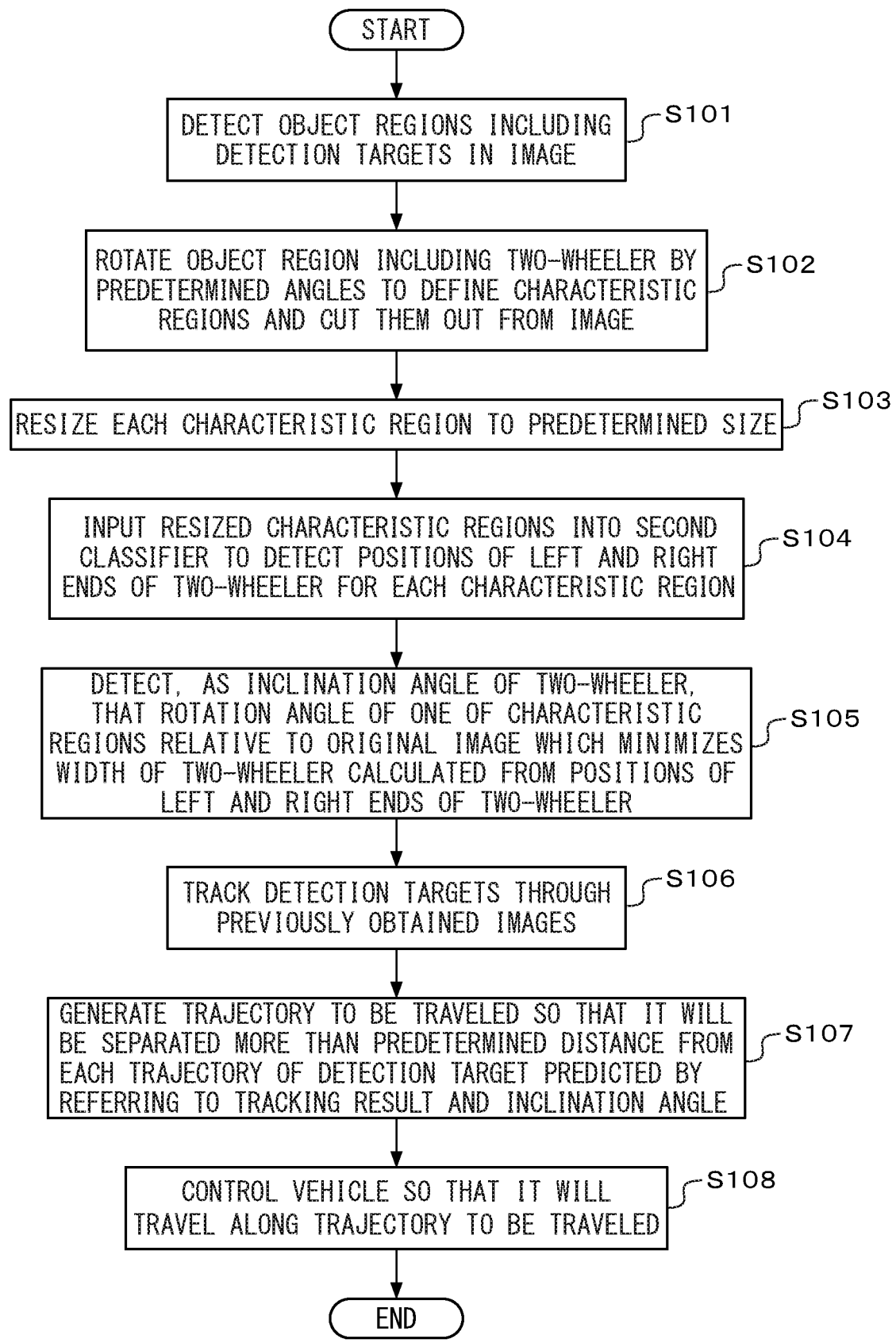

APPARATUS FOR DETECTING INCLINATION ANGLE AND CONTROLLER

FIELD

The present invention relates to an apparatus for detecting the inclination angle of a two-wheeler represented in an image to the normal of the ground, and a controller including such an apparatus to control travel of a vehicle.

BACKGROUND

To predict the motion of a two-wheeler traveling near a host vehicle, techniques have been proposed to detect the inclination angle of the two-wheeler to the normal of the ground (e.g., see Japanese Unexamined Patent Publications Nos. 2017-185862 and 2017-102928). In the present application, the slope angle of the line joining the point where a two-wheeler viewed from a position in front or behind touches the ground and the top of the head of its rider to the normal of the ground is referred to as the inclination angle of the two-wheeler to the normal of the ground. This angle may be simply referred to as the "inclination angle," below.

For example, a drive support system disclosed in Japanese Unexamined Patent Publication No. 2017-185862 detects the angle of bank of a motorcycle passing a host vehicle, and determines whether the motorcycle will cut in on the host vehicle, based on the detected angle of bank.

A method for operating a vehicle disclosed in Japanese Unexamined Patent Publication No. 2017-102928 includes determining a mean column value of pixels associated with a two-wheeler in at least two lines of an image, and determining the inclination angle of the two-wheeler, based on the mean column values.

SUMMARY

Since a rider of a two-wheeler generally inclines the two-wheeler at a change of the direction of travel to the side to which he/she wishes to travel, the inclination angle of a two-wheeler is important information to predict the motion thereof. Thus, it is desirable to correctly detect the inclination angle of a two-wheeler represented in an image.

It is an object of the present invention to provide an apparatus that can detect the inclination angle of a two-wheeler represented in an image to the normal of the ground.

According to an embodiment, an apparatus for detecting an inclination angle is provided. The apparatus includes a processor configured to: input an image generated by a camera into a first classifier that has been trained to detect a two-wheeler, thereby detecting an object region including the two-wheeler in the image; rotate the object region by predetermined different angles to define characteristic regions as respective rotated regions; cut out the characteristic regions from the image; detect a width of the two-wheeler in each of the characteristic regions; and detect a rotation angle relative to the image as the inclination angle of the two-wheeler to the normal of the ground, based on rotation angles of the respective characteristic regions relative to the image and widths of the two-wheeler in the respective characteristic regions, the rotation angle minimizing the width of the two-wheeler.

The processor of the apparatus preferably resizes each of the characteristic regions to a predetermined size and inputs the resized characteristic regions into a second classifier to determine the positions of the left and right ends of the two-wheeler in each of the characteristic regions, and determines, for each of the characteristic regions, the difference between the positions of the left and right ends in the characteristic region as the width of the two-wheeler in the characteristic region, the second classifier having been trained to detect the positions of the left and right ends of the two-wheeler.

The processor of the apparatus preferably performs curve fitting using pairs formed by the widths of the two-wheeler in the respective characteristic regions and the rotation angles of the corresponding characteristic regions relative to the image to determine a fitted curve representing change in the width of the two-wheeler as a function of change in the rotation angle, and detects a rotation angle that minimizes the width of the two-wheeler in the fitted curve to be the inclination angle of the two-wheeler to the normal of the ground.

According to another embodiment, an apparatus for detecting an inclination angle is provided. The apparatus includes a processor configured to: input an image generated by a camera into a first classifier that has been trained to detect a two-wheeler, thereby detecting an object region including the two-wheeler in the image; rotate the object region by predetermined different angles to define characteristic regions as respective rotated regions; cut out the characteristic regions from the image; detect a height of the two-wheeler in each of the characteristic regions; and detect a rotation angle relative to the image as the inclination angle of the two-wheeler to the normal of the ground, based on rotation angles of the respective characteristic regions relative to the image and heights of the two-wheeler in the respective characteristic regions, the rotation angle maximizing the height of the two-wheeler.

According to still another embodiment, a controller for controlling travel of a vehicle is provided. The controller includes a processor configured to: input an image generated by a camera mounted on the vehicle into a first classifier that has been trained to detect a two-wheeler, thereby detecting an object region including the two-wheeler located near the vehicle in the image; rotate the object region by predetermined different angles to define characteristic regions as respective rotated regions; cut out the characteristic regions from the image; detect a width of the two-wheeler in each of the characteristic regions; and detect a rotation angle relative to the image as the inclination angle of the two-wheeler to the normal of the ground, based on rotation angles of the respective characteristic regions relative to the image and widths of the two-wheeler in the respective characteristic regions, the rotation angle minimizing the width of the two-wheeler. The processor is further configured to predict a trajectory on which the two-wheeler will travel, based on the detected inclination angle of the two-wheeler; determine a trajectory to be traveled of the vehicle, based on the predicted trajectory, so that the vehicle will be separated from the two-wheeler more than a predetermined distance; and control the vehicle so that the vehicle will travel along the trajectory.

The apparatus according to the present invention has an advantageous effect of being able to detect the inclination angle of a two-wheeler represented in an image to the normal of the ground.

BRIEF DESCRIPTION OF DRAWINGS

FIG. 6 illustrates an example of the relationship between clipped characteristic regions and resized characteristic regions.

FIG. 9 is a timing chart of processes performed by the units related to the inclination detecting process.

FIG. 10 is an operation flowchart of the vehicle control process including the inclination detecting process.

DESCRIPTION OF EMBODIMENTS

Hereinafter, an apparatus for detecting an inclination angle will be described with reference to the accompanying drawings. The apparatus detects the inclination angle of a two-wheeler represented in an image to the normal of the ground. To this end, the apparatus inputs the image into a first classifier that has been trained to detect a two-wheeler, thereby detecting a region including a two-wheeler represented in the image. This region may be referred to as an "object region," below. The apparatus then rotates the object region by predetermined angles to define characteristic regions as respective rotated regions, and cuts out the characteristic regions from the image. The apparatus then resizes each of the characteristic regions to a certain size, and inputs input data including individual pixel values of the resized characteristic regions into a second classifier to determine, for each of the characteristic regions, the width of the two-wheeler in the horizontal direction of the characteristic region. This width may be simply referred to as the width of the two-wheeler in the characteristic region, below. The apparatus then detects a rotation angle that minimizes the width of the two-wheeler, as the inclination angle of the two-wheeler, based on the widths of the two-wheeler in the respective characteristic regions and the rotation angles of the respective characteristic regions relative to the original image.

The following describes an example in which the apparatus for detecting an inclination angle is applied to a vehicle control system. In this example, the apparatus performs an inclination detecting process on chronologically sequential images obtained by a camera mounted on a vehicle to detect a two-wheeler near the vehicle, and detects the inclination angle of the detected two-wheeler. The vehicle control system then predicts the motion of the two-wheeler, based on the detected inclination angle, and performs automated driving control of the vehicle, depending on the predicted motion.

Figure 1:
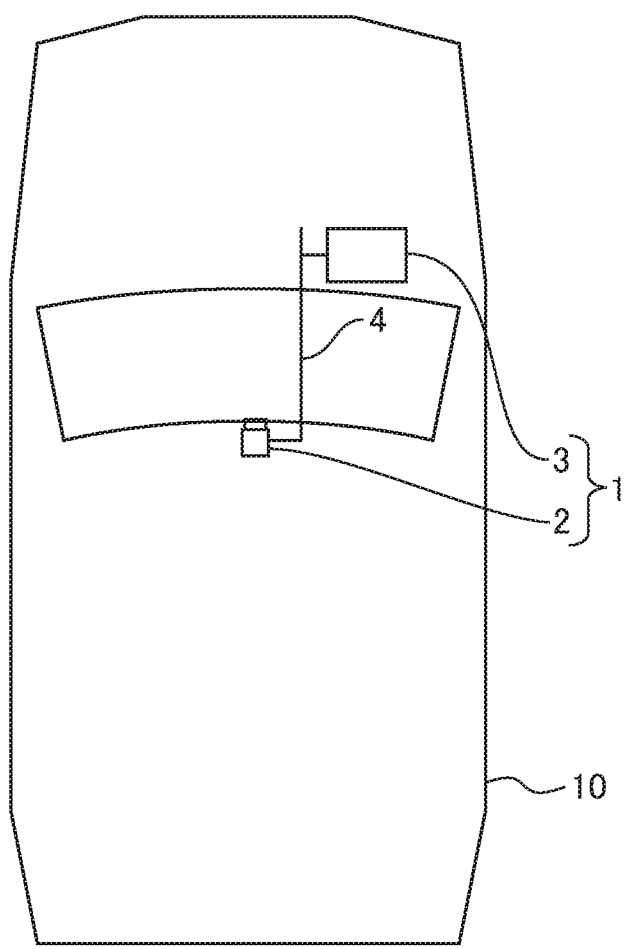
FIG. 1 schematically illustrates the configuration of a vehicle control system including the apparatus for detecting an inclination angle.
Figure 2:
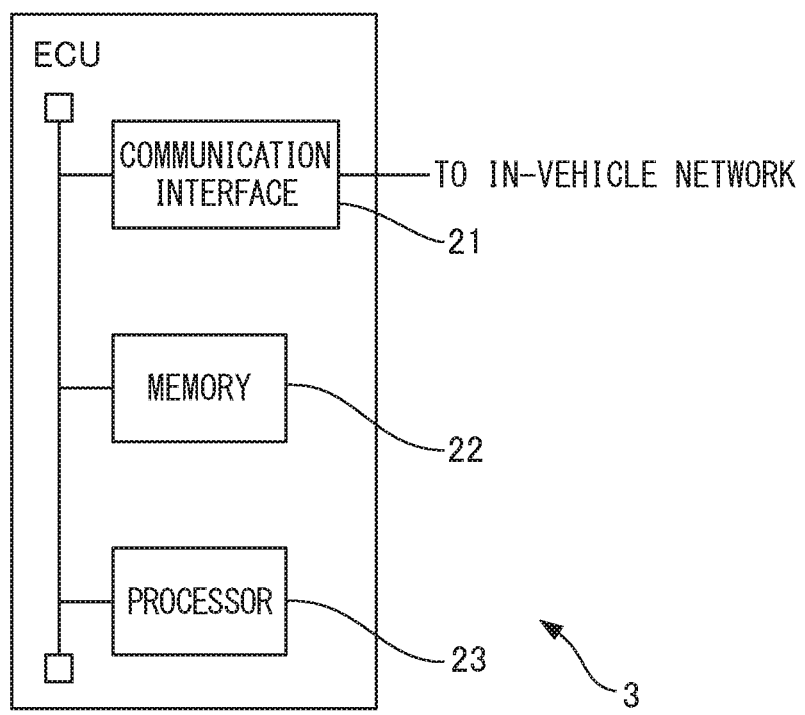
FIG. 2 illustrates the hardware configuration of an electronic control unit, which is an embodiment of the apparatus.

FIG. 1 schematically illustrates the configuration of a vehicle control system including the apparatus for detecting an inclination angle. FIG. 2 illustrates the hardware configuration of an electronic control unit, which is an embodiment of the apparatus. In the present embodiment, the vehicle control system 1, which is mounted on a vehicle 10 and controls the vehicle 10, includes a camera 2 for taking a picture of surroundings of the vehicle 10, and an electronic control unit (ECU) 3, which is an example of the apparatus. The camera 2 is connected to the ECU 3 so that they can communicate via an in-vehicle network 4 conforming to a standard, such as a controller area network. The vehicle control system 1 may further include a storage device storing a map used for automated driving control of the vehicle 10. The vehicle control system 1 may further include a range sensor, such as LiDAR or radar; a receiver, such as a GPS receiver, for determining the location of the vehicle 10 in conformity with a satellite positioning system; a wireless communication terminal for wireless communication with another device; and a navigation device for searching for a planned travel route of the vehicle 10.

The camera 2 is an example of the image capturing unit that is a sensor for detecting an object in a predetermined sensing range. The camera 2 includes a two-dimensional detector constructed from an array of optoelectronic transducers, such as CCD or C-MOS, having sensitivity to visible light and a focusing optical system focusing an image of a target region on the two-dimensional detector. The camera 2 is mounted, for example, in the interior of the vehicle 10 so as to be oriented to the front of the vehicle 10. The camera 2 takes a picture of a region in front of the vehicle 10 every predetermined capturing period (e.g., 1/30 to 1/10 seconds), and generates images in which the front region is represented. The images obtained by the camera 2 are preferably color images. The vehicle 10 may include multiple cameras taking pictures in different orientations or having different focal lengths.

Every time generating an image, the camera 2 outputs the generated image to the ECU 3 via the in-vehicle network 4.

The ECU 3 controls the vehicle 10. In the present embodiment, the ECU 3 controls the vehicle 10 so as to automatically drive the vehicle 10, depending on an object detected from chronologically sequential images obtained by the camera 2. To this end, the ECU 3 includes a communication interface 21, a memory 22, and a processor 23.

The communication interface 21, which is an example of a communication unit, includes an interface circuit for connecting the ECU 3 to the in-vehicle network 4. In other words, the communication interface 21 is connected to the camera 2 via the in-vehicle network 4. Every time receiving an image from the camera 2, the communication interface 21 passes the received image to the processor 23.

The memory 22, which is an example of a storing unit, includes, for example, volatile and nonvolatile semiconductor memories. In the case that the processor 23 includes multiple operation units as will be described below, the memory 22 may include dedicated memory circuits for the respective operation units. The memory 22 stores various types of data and various parameters used in the inclination detecting process performed by the processor 23 of the ECU 3, e.g., images received from the camera 2, various parameters for specifying classifiers used in the inclination detecting process, and confidence-score thresholds for respective types of objects. The memory 22 also stores various types of data generated in the inclination detecting process, such as a detected-object list indicating information related to detected objects, for a certain period. The memory 22 may further store information used for travel control of the vehicle 10, such as map information.

The processor 23, which is an example of a control unit, includes one or more central processing units (CPUs) and a peripheral circuit thereof. The processor 23 may further include another arithmetic circuit, such as a logical operation unit, a numerical operation unit, or a graphics processing unit (GPU). Every time receiving an image from the camera 2 during travel of the vehicle 10, the processor 23 performs a vehicle control process including the inclination detecting process on the received image. The processor 23 controls the vehicle 10 so as to automatically drive the vehicle 10, depending on a detected object near the vehicle 10, in particular, a two-wheeler.

Figure 3:
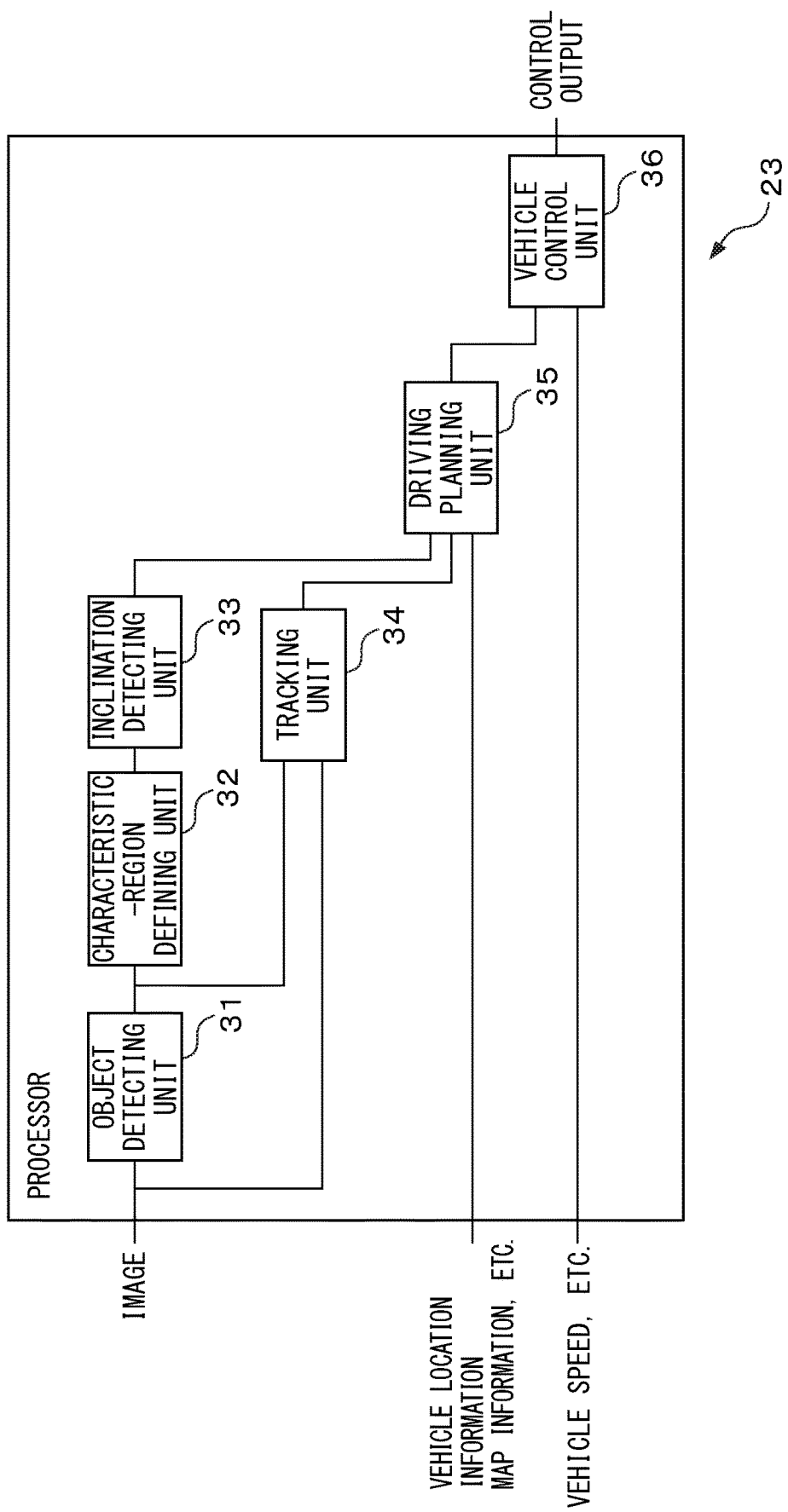
FIG. 3 is a functional block diagram of a processor of the electronic control unit, related to a vehicle control process including an inclination detecting process.

FIG. 3 is a functional block diagram of the processor 23 of the ECU 3, related to the vehicle control process including the inclination detecting process. The processor 23 includes an object detecting unit 31, a characteristic-region defining unit 32, an inclination detecting unit 33, a tracking unit 34, a driving planning unit 35, and a vehicle control unit 36. These units included in the processor 23 are, for example, functional modules implemented by a computer program executed on the processor 23, or may be dedicated arithmetic circuits provided in the processor 23. Of these units included in the processor 23, the object detecting unit 31, the characteristic-region defining unit 32, and the inclination detecting unit 33 perform the inclination detecting process. In the case that the vehicle 10 includes multiple cameras, the processor 23 may perform, for each camera, the inclination detecting process, based on images obtained by the camera.

Every time receiving an image from the camera 2, the object detecting unit 31 inputs the latest received image into a first classifier for object detection to detect an object region including a detection target, such as a two-wheeler, represented in the image. Besides two-wheelers, examples of detection targets include objects that affect travel control of the vehicle 10, e.g., other vehicles, humans, signposts, traffic lights, road markings such as lane division lines, and other objects on the road.

In the present embodiment, the object detecting unit 31 uses, as the first classifier, a deep neural network (DNN) that has been trained to detect an object region including a detection target (including a two-wheeler) represented in an image and to identify the type of the detection target. The DNN used by the object detecting unit 31 may be, for example, a DNN having a convolutional neural network (hereafter, "CNN") architecture, such as a Single Shot MultiBox Detector (SSD) or a Faster R-CNN.

Figure 4:
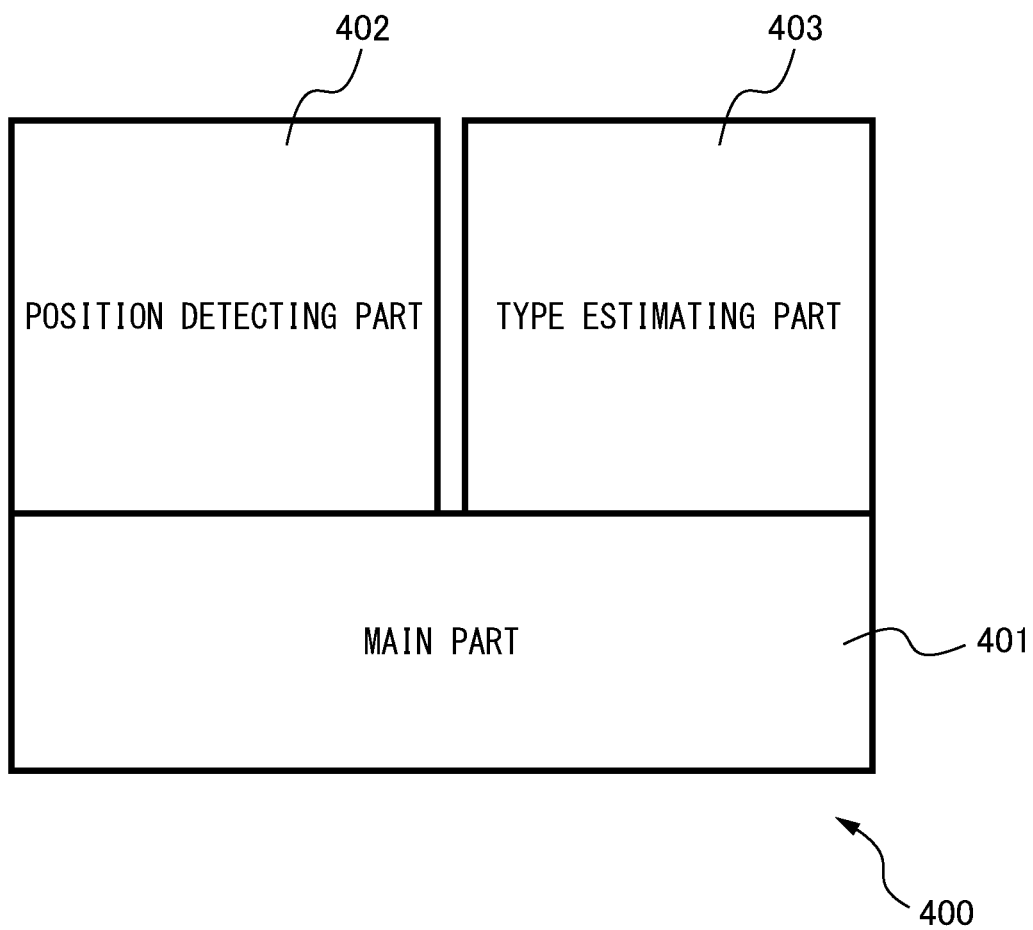
FIG. 4 illustrates an example of the configuration of a DNN used as the first classifier.

FIG. 4 illustrates an example of the configuration of a DNN used as the first classifier. The DNN 400 includes a main part 401, which is provided on the input of images, and a position detecting part 402 and a type estimating part 403, which are provided closer to the output than the main part 401. The position detecting part 402 outputs an object region including a detection target represented in an image, depending on the output from the main part 401. The type estimating part 403 calculates confidence scores of respective types of detection targets represented in object regions detected by the position detecting part 402, depending on the output from the main part 401. The position detecting part 402 and the type estimating part 403 may be integrated.

The main part 401 may be, for example, a CNN including multiple layers connected in series from the input toward the output. These multiple layers include two or more convolution layers. The multiple layers of the main part 401 may further include a pooling layer every one or more convolution layers. The multiple layers of the main part 401 may further include one or more fully-connected layers. For example, the main part 401 may be configured similarly to a base layer of an SSD. Alternatively, the main part 401 may be configured in accordance with another CNN architecture, such as VGG-19, AlexNet, or Network-In-Network.

Upon input of an image, the main part 401 performs an operation on the image in each layer to output a feature map calculated from the image. The main part 401 may output multiple feature maps of different resolutions. For example, the main part 401 may output a feature map with the same resolution as the inputted image, and one or more feature maps with a resolution lower than the inputted image.

The feature maps outputted from the main part 401 are inputted into the position detecting part 402 and the type estimating part 403. The position detecting part 402 and the type estimating part 403 may be, for example, CNNs each including multiple layers connected in series from the input toward the output. In the position detecting part 402 and the type estimating part 403, the multiple layers of each CNN include two or more convolution layers. In the position detecting part 402 and the type estimating part 403, the multiple layers of each CNN may include a pooling layer every one or more convolution layers. The convolution layers and the pooling layers may be common to the CNNs of the position detecting part 402 and the type estimating part 403. Additionally, in the position detecting part 402 and the type estimating part 403, the multiple layers may include one or more fully-connected layers. In this case, the fully-connected layers are preferably provided closer to the output than the convolution layers. The outputs from the convolution layers may be directly inputted into the fully-connected layers. The output layer of the type estimating part 403 may be a softmax layer that calculates confidence scores of respective types of detection targets in accordance with a softmax function, or a sigmoid layer that calculates such confidence scores in accordance with a sigmoid function.

The position detecting part 402 and the type estimating part 403 are trained so as to output confidence scores of respective types of detection targets, for example, for each of regions located at various positions in an image and having various sizes and aspect ratios. Thus, upon input of an image, the classifier 400 outputs confidence scores of respective types of detection targets for each of regions located at various positions in the image and having various sizes and aspect ratios. The position detecting part 402 and the type estimating part 403 then detect a region for which the confidence score of a certain type of detection target is not less than a predetermined confidence-score threshold, as an object region showing a detection target of this type.

Images (training images) included in training data used for training of the classifier 400 are tagged with, for example, types of detection targets (e.g., passenger vehicles, buses, trucks, and motorcycles) and circumscribed rectangles of the detection targets, which are object regions showing the detection targets.

The classifier 400 is trained with a large number of such training images in accordance with a training technique, such as backpropagation. The use of the classifier 400 trained in this way allows the processor 23 to accurately detect a target object, such as a two-wheeler, from an image.

The object detecting unit 31 may further perform a non-maximum suppression (NMS) process to select one of object regions that are assumed to show the same object out of two or more overlapping object regions.

The object detecting unit 31 enters, in a detected-object list, the position and range of each object region in the image, and the type of the object included in the object region. The object detecting unit 31 stores the detected-object list in the memory 22.

For each detected two-wheeler, the characteristic-region defining unit 32 defines characteristic regions for determining the width of the two-wheeler. The following describes processing for a single two-wheeler because the characteristic-region defining unit 32 may perform the same processing for each two-wheeler.

The characteristic-region defining unit 32 refers to the detected-object list to identify the object region showing the detected two-wheeler, and rotates the object region by predetermined different angles relative to the original image to define characteristic regions as respective rotated regions. The characteristic-region defining unit 32 then cuts out the characteristic regions from the image. When two or more two-wheelers are entered in the detected-object list, the characteristic-region defining unit 32 may define the characteristic regions for each of the two-wheelers. The predetermined angles may be, for example, in units of 5°, 10°, or 20°.

Figure 5:
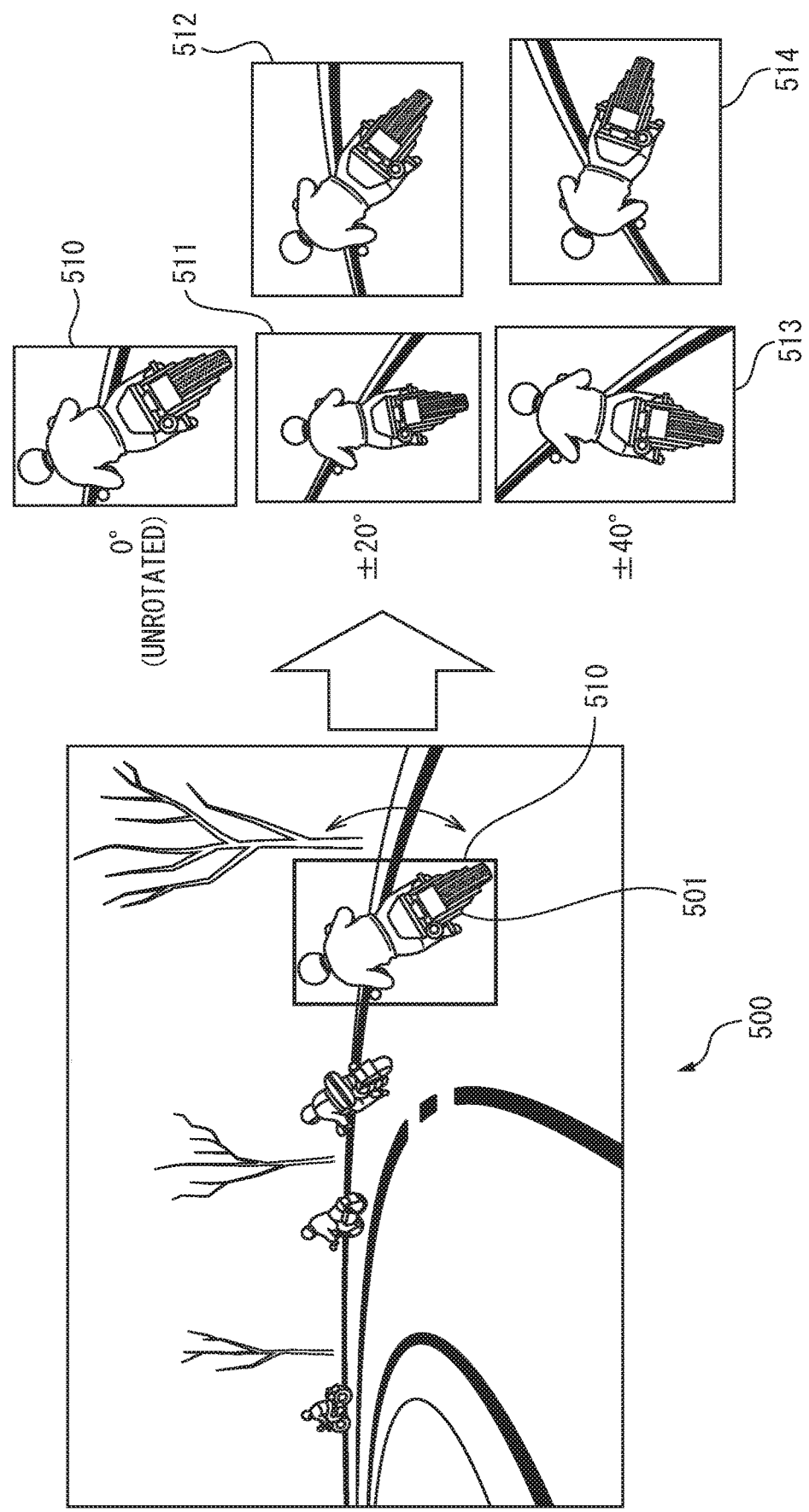
FIG. 5 illustrates an example of an object region and characteristic regions for a two-wheeler represented in an image.

FIG. 5 illustrates an example of an object region and characteristic regions for a two-wheeler represented in an image. In this example, a rectangular object region 510 including a two-wheeler (together with a rider) 501 represented in an image 500 is rotated by multiples of ±20°, and thereby five characteristic regions 510 to 514, which include the object region 510 itself (i.e., the rotation angle is 0°) are defined. The characteristic-region defining unit 32 preferably defines the characteristic regions 510 to 514 so that the characteristic regions 510 to 514 each cover the whole original object region 510. This prevents part of the left and right edges of the two-wheeler from being outside a characteristic region, and allows a second classifier described below to correctly detect the positions of the left and right ends of the two-wheeler.

The characteristic-region defining unit 32 cuts out the defined characteristic regions from the original image. Each of the obtained characteristic regions includes the two-wheeler that is a target for detecting an inclination angle. Since the characteristic regions are defined by rotating the corresponding object region by different angles, the slopes of the two-wheeler to the bottoms of the respective characteristic regions are different. In general, the length of a two-wheeler viewed from a position in front or behind is longer in the direction of the line joining the point where the two-wheeler touches the ground and the top of the head of its rider (hereafter, referred to as the "center-line direction" for convenience of description) than in the direction perpendicular to the center-line direction. For this reason, as illustrated by the characteristic regions 510 to 514 in FIG. 5, the larger the angle formed between the bottom of a characteristic region and the center-line direction of a two-wheeler, the smaller the width of the two-wheeler in the horizontal direction of the characteristic region (i.e., in the direction parallel to the bottom of the characteristic region). In other words, the smaller the difference between the rotation angle of a characteristic region relative to the original image and the inclination angle of a two-wheeler, the smaller the width of the two-wheeler in the horizontal direction of the characteristic region. Thus, detecting the widths of the two-wheeler from the respective characteristic regions enables estimation of the inclination angle of the two-wheeler.

The characteristic-region defining unit 32 performs scale transformation, such as downsampling, upsampling, bi-linear interpolation, or bi-cubic interpolation, to resize each of the characteristic regions cut out from the image so that the horizontal and vertical widths thereof may be a predetermined size (e.g., 64-by-64 pixels). This results in characteristic regions of the same size being inputted into a second classifier described below regardless of the size and the inclination angle of the two-wheeler in the image, and thus simplifies the configuration of the second classifier.

FIG. 6 illustrates an example of the relationship between characteristic regions cut out from an image and resized characteristic regions. Characteristic regions 610 to 614 in FIG. 6, which correspond to the characteristic regions 510 to 514 in FIG. 5, respectively, are unresized characteristic regions. Characteristic regions 620 to 624 are resized characteristic regions obtained by resizing the characteristic regions 610 to 614, respectively, to a predetermined size. The rotation angles of the unresized characteristic regions 610 to 614 relative to the original image are different, and each of the characteristic regions 610 to 614 is defined so as to cover the whole object region. Thus, the horizontal and vertical sizes of the characteristic regions 610 to 614 are different. However, the horizontal and vertical sizes of the resized characteristic regions 620 to 624 are equal.

The characteristic-region defining unit 32 outputs the resized characteristic regions to the inclination detecting unit 33. The characteristic-region defining unit 32 also notifies the inclination detecting unit 33 of the ratio of the resized horizontal width to the unresized horizontal width (hereafter, referred to as the "normalization ratio" for convenience of description) for each of the characteristic regions.

The inclination detecting unit 33 detects the inclination angle of each two-wheeler entered in the detected-object list. The following describes processing for a single two-wheeler because the inclination detecting unit 33 may perform the same processing for each two-wheeler.

The inclination detecting unit 33 inputs input data including individual pixel values of the resized characteristic regions into a second classifier that has been trained to detect the positions of the left and right ends of a two-wheeler, thereby detecting, for each of the characteristic regions, the positions of the left and right ends of the two-wheeler represented in the characteristic region. For each of the characteristic regions, the inclination detecting unit 33 detects the width of the two-wheeler represented in the characteristic region, based on the positions of the left and right ends of the two-wheeler detected from the characteristic region. The inclination detecting unit 33 then detects a rotation angle that minimizes the width of the two-wheeler, as the inclination angle of the two-wheeler, based on the widths of the two-wheeler in the respective characteristic regions and the rotation angles of the respective characteristic regions relative to the original image. In the present embodiment, the inclination detecting unit 33 detects, as the inclination angle of the two-wheeler, that rotation angle of one of the characteristic regions relative to the original image which minimizes the width of the two-wheeler.

For example, assume that the size of the resized individual characteristic regions is 64-by-64 pixels, the number of characteristic regions is five, and the original image from which the characteristic regions are cut out is a color image represented by three channels of RGB. Then, input data of a fourth-order tensor having a size of (5 [the number of characteristic regions], 3 [the number of channels], 64 [the number of pixels in the horizontal direction], 64 [the number of pixels in the vertical direction]) is inputted into the second classifier.

The second classifier may be, for example, a neural network having a CNN architecture. In this case, the second classifier includes one or more convolution layers that perform a convolution operation for the horizontal and vertical directions or for the horizontal, vertical, and channel directions to generate a feature map; one or more fully-connected layers that perform a fully-connected operation on the feature map calculated by the convolution layers; and an output layer that outputs the positions of the left and right ends of the two-wheeler in each of the characteristic regions, based on the result of the operation performed by the fully-connected layers. The second classifier may further include, between the convolution layers, a pooling layer that reduces the resolution of the feature map. The output layer uses, for example, a sigmoid function as an activation function, and outputs values indicating how likely the respective horizontal positions are to be the left end of the two-wheeler in the range of [0,1] for each of the characteristic regions. In this case, for example, the position where the output value is 0 represents the left end of the two-wheeler, and the position where the output value is 1 represents the right end of the two-wheeler. Alternatively, the output layer may regress the positions of the left and right ends for each of the characteristic regions without using an activation function.

The second classifier has been trained in accordance with backpropagation by using training data including pairs each formed by a set of resized characteristic regions like those described above and annotation information indicating the positions of the left and right ends of the two-wheeler in the characteristic regions included in this set. The set of resized characteristic regions used as the training data is created, for example, by inputting an image for generating the training data into the first classifier to identify an object region showing a two-wheeler and then performing processing similar to that of the characteristic-region defining unit 32 on the identified object region.

Figure 7:
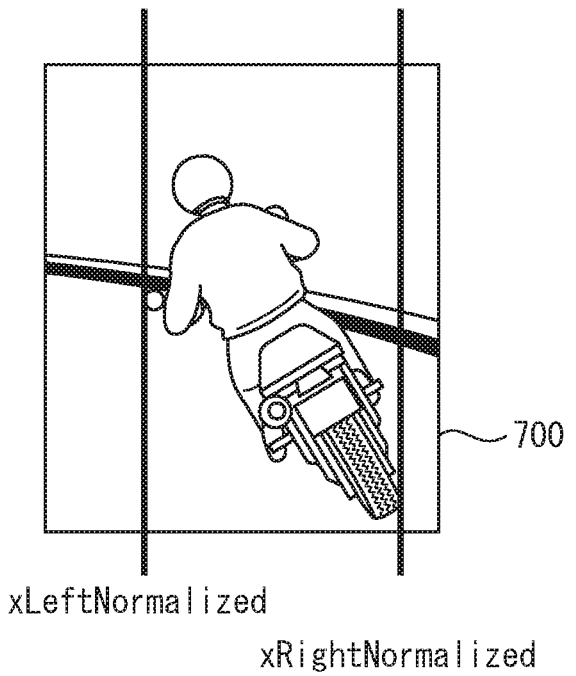
FIG. 7 illustrates an example of a detection result of the left and right ends of a two-wheeler obtained by the second classifier.

FIG. 7 illustrates an example of a detection result of the left and right ends of a two-wheeler obtained by the second classifier. As illustrated in FIG. 7, the second classifier outputs the left end position "xLeftNormalized" and the right end position "xRightNormalized" of a two-wheeler in a characteristic region 700 that has been resized, i.e., inputted into the second classifier.

For each of the resized characteristic regions, the inclination detecting unit 33 corrects the positions of the left and right ends of the two-wheeler outputted from the second classifier to the positions in the unresized characteristic region, based on the normalization ratio of the characteristic region. More specifically, for each of the resized characteristic regions, the inclination detecting unit 33 can divide the positions of the left and right ends of the two-wheeler in the characteristic region by the normalization ratio of the characteristic region to determine the positions of the left and right ends of the two-wheeler in the unresized characteristic region. Then, for each of the unresized characteristic regions, the inclination detecting unit 33 calculates the difference between the positions of the left and right ends of the two-wheeler as the width of the two-wheeler in the characteristic region. The inclination detecting unit 33 identifies one of the unresized characteristic regions that minimizes the width of the two-wheeler, and detects the rotation angle of the identified characteristic region relative to the original image as the inclination angle of the two-wheeler.

For example, in the example illustrated in FIG. 5, the width of the two-wheeler 501 is the smallest in the characteristic region 513, which is obtained by rotating the object region clockwise by 40°, of the five characteristic regions 510 to 514. Thus, the inclination detecting unit 33 determines that the inclination angle of the two-wheeler 501 is 40° clockwise.

According to a modified example, the inclination detecting unit 33 performs curve fitting using pairs formed by the widths of the two-wheeler and the rotation angles of the characteristic regions by means of a fitting technique, such as nonlinear least squares, to construct a fitted curve, such as a second-order curve. This fitted curve represents change in the width of the two-wheeler as a function of change in the rotation angle relative to the original image. The inclination detecting unit 33 may identify a rotation angle that minimizes the width of the two-wheeler in the fitted curve, and detect the identified rotation angle as the inclination angle of the two-wheeler.

Figure 8:
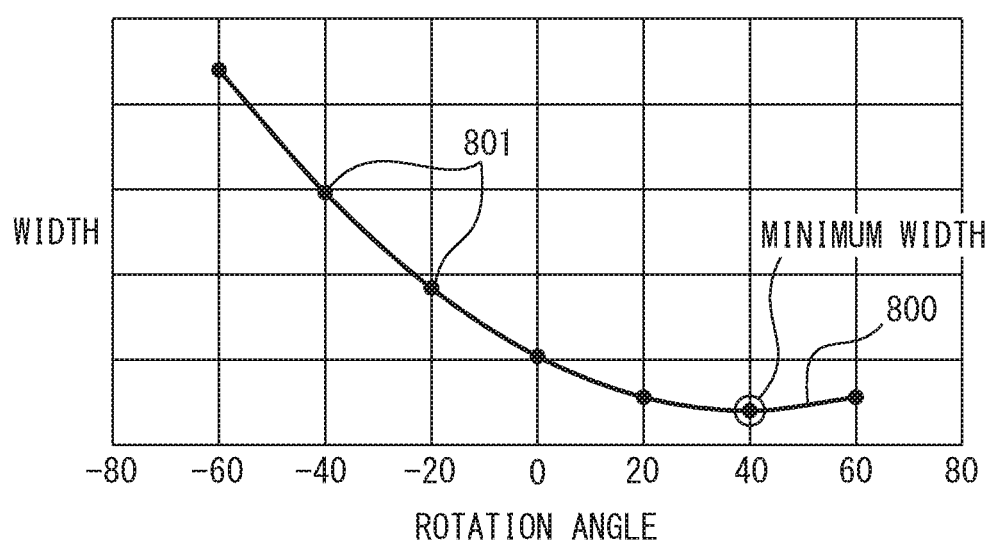
FIG. 8 is a diagram for briefly describing how an inclination angle is detected using detection results of the width of the two-wheeler for the respective characteristic regions.

FIG. 8 is a diagram for briefly describing how an inclination angle is detected using detection results of the width of the two-wheeler for the respective characteristic regions according to this modified example. The abscissa in FIG. 8 represents the rotation angle of each characteristic region relative to the original image. In this example, the rotation angle of a characteristic region rotated clockwise is negative, and that of a characteristic region rotated anticlockwise is positive. The ordinate represents the width of the two-wheeler. A curve 800 represents a fitted curve for pairs 801 formed by the widths of the two-wheeler obtained for the respective characteristic regions and the rotation angles of the corresponding characteristic regions. In the fitted curve 800 of this example, the width of the two-wheeler is the smallest at a 40° rotation angle. Thus, the inclination detecting unit 33 determines that the inclination angle of the two-wheeler is 40°.

According to this modified example, even when none of the rotation angles of the characteristic regions match the inclination angle of a two-wheeler, the inclination detecting unit 33 can detect the inclination angle of the two-wheeler correctly.

For each two-wheeler entered in the detected-object list, the inclination detecting unit 33 stores, in the memory 22, the detected inclination angle of the two-wheeler in association with information of the two-wheeler.

FIG. 9 is a timing chart of processes performed by the units related to the inclination detecting process. The processes of the units of the processor 23 are managed, for example, by a scheduler (not illustrated) executed on the processor 23, and are performed in accordance with the timing chart illustrated in FIG. 9. The abscissa of FIG. 9 represents time. In FIG. 9, individual blocks indicate execution of the processes shown in the respective blocks, and individual arrows indicate delivery of data (e.g., images, the detected-object list, and characteristic regions) between the processes. For example, the ECU 3 receives an image from the camera 2 at time t1, and then, the GPU included in the processor 23 performs a target-object detecting process of the object detecting unit 31 on the image. Before the target-object detecting process, preprocessing, such as contrast correction or color conversion, may be performed on the image.

After the target-object detecting process, the CPU included in the processor 23 performs postprocessing of object detection, such as entry of the types and the object regions of detected objects into the detected-object list, and thereafter performs a tracking process of the tracking unit 34 described below. In parallel with the tracking process, the CPU performs a characteristic-region defining process of the characteristic-region defining unit 32 for a detected two-wheeler. After the characteristic-region defining process, the GPU performs resizing of the individual characteristic regions, generation of that data to be inputted into the second classifier of the inclination detecting unit 33 which includes the resized individual characteristic regions, and a process of the second classifier to detect the left and right ends of the two-wheeler in the characteristic regions. Based on this detection result, the CPU performs detection of the inclination angle of the two-wheeler. The result of the tracking process and that of detection of the inclination angle are used for the processes of the driving planning unit 35 and the vehicle control unit 36. Resizing of the individual characteristic regions, generation of data to be inputted into the second classifier, and the process of the second classifier to detect the left and right ends of the two-wheeler in the characteristic regions rotated by different rotation angles may be performed in batch processing.

The tracking unit 34 refers to the detected-object list to associate, for each object region detected from the latest image, the detection target represented in the object region with a detection target detected from a past image, thereby tracking the detection target represented in the object region.

The tracking unit 34 applies, for example, a tracking process based on optical flow, such as the Lucas-Kanade method, to the object region of interest in the latest image and the object regions in the past images, thereby tracking the detection target represented in the object regions. To this end, the tracking unit 34 applies, for example, a filter for extracting characteristic points, such as a SIFT or Harris operator, to the object region of interest, thereby extracting multiple characteristic points from the object region. Then, the tracking unit 34 may identify those points in the object regions in the past images which correspond to each of the characteristic points in accordance with the applied tracking technique, thereby calculating the optical flow. Alternatively, the tracking unit 34 may apply another tracking technique, which is applied for tracking a moving object detected from an image, to the object region of interest in the latest image and the object regions in the past images, thereby tracking the detection target represented in the object regions.

The tracking unit 34 regards a detection target that is detected from the latest image and associated with none of detection targets represented in the past images as a new tracking target, assigns this detection target an identification number different from the identification numbers of the other tracked detection targets, and enters the assigned identification number in the detected-object list. In contrast, the tracking unit 34 associates a detection target that is detected from the latest image and associated with a detection target represented in the past images, i.e., one of the tracked detection targets, with the same identification number as assigned to this tracked detection target.

The driving planning unit 35 refers to the detected-object list to generate one or more trajectories to be traveled of the vehicle 10 so that the vehicle 10 will not collide with an object near the vehicle 10. Each trajectory to be traveled is represented as, for example, a set of target locations of the vehicle 10 at points in time from the current time to a predetermined time ahead thereof. For example, the driving planning unit 35 refers to the detected-object list to perform viewpoint transformation, using information such as the position at which the camera 2 is mounted on the vehicle 10, thereby transforming the image coordinates of the objects in the detected-object list into coordinates in an aerial image ("aerial-image coordinates"). The driving planning unit 35 then performs a tracking process on sequential aerial-image coordinates, using the Kalman filter, the Particle filter, or another filter, to track the objects entered in the detected-object list, and uses the trajectories obtained from the tracking results to determine predicted trajectories of the respective objects to a predetermined time ahead. When the detection target of interest is a two-wheeler, the driving planning unit 35 uses the inclination angles of the two-wheeler corresponding to the times of acquisition of the respective images during tracking to determine the predicted trajectory. For example, assume that the two-wheeler that is the detection target of interest is inclined anticlockwise relative to the normal of the ground (i.e., inclined to the left as viewed from the vehicle 10). Then, the larger the anticlockwise inclination angle is and becomes with the passage of time, the higher the possibility that the two-wheeler will make a lane change to the left or a left turn. Thus, the driving planning unit 35 determines a predicted trajectory of this two-wheeler such that the larger the anticlockwise inclination angle is and becomes with the passage of time, the faster the two-wheeler makes a lane change to the left or a left turn. Similarly, assume that the two-wheeler that is the detection target of interest is inclined clockwise relative to the normal of the ground (i.e., inclined to the right as viewed from the vehicle 10). Then, the larger the clockwise inclination angle is and becomes with the passage of time, the higher the possibility that the two-wheeler will make a lane change to the right or a right turn. Thus, the driving planning unit 35 determines a predicted trajectory of this two-wheeler such that the larger the clockwise inclination angle is and becomes with the passage of time, the faster the two-wheeler makes a lane change to the right or a right turn. When the absolute value of the inclination angle of the two-wheeler that is the detection target of interest is not greater than a predetermined angle (e.g., 5°), it is highly likely that the two-wheeler will travel straight. Thus, the driving planning unit 35 determines a predicted trajectory of this two-wheeler such that it will travel straight.

The driving planning unit 35 generates a trajectory to be traveled of the vehicle 10, based on the predicted trajectories of the tracked objects, and the location, speed, and orientation of the vehicle 10, so that a predicted distance between the vehicle 10 and any of the tracked objects will be not less than a predetermined distance until a predetermined time ahead. The driving planning unit 35 can estimate the location, speed, and orientation of the vehicle 10, based on, for example, current location information that is obtained from a GPS receiver (not illustrated) mounted on the vehicle 10 and indicates the current location of the vehicle 10. Alternatively, every time an image is obtained by the camera 2, a localizing processing unit (not shown) may detect lane division lines on the right and left of the vehicle 10 from the image, and compare the detected lane division lines with the map information stored in the memory 22, thereby estimating the location, speed and orientation of the vehicle 10. Additionally, the driving planning unit 35 may refer to, for example, the current location information of the vehicle 10 and the map information stored in the memory 22 to count the number of lanes available for travel by the vehicle 10. When more than one lane is available for travel by the vehicle 10, the driving planning unit 35 may generate a trajectory to be traveled so that the vehicle 10 will make a lane change.

The driving planning unit 35 may generate multiple trajectories to be traveled. In this case, the driving planning unit 35 may select one of the torajectories such that the sum of the absolute values of acceleration of the vehicle 10 is the smallest.

The driving planning unit 35 notifies the vehicle control unit 36 of the generated trajectory to be traveled.

The vehicle control unit 36 controls the components of the vehicle 10 so that the vehicle 10 will travel along the notified trajectory to be traveled. For example, the vehicle control unit 36 determines the acceleration of the vehicle 10 in accordance with the notified trajectory to be traveled and the current speed of the vehicle 10 measured by a vehicle speed sensor (not illustrated), and determines the degree of accelerator opening or the amount of braking so that the acceleration of the vehicle 10 will be equal to the determined acceleration. The vehicle control unit 36 then determines the amount of fuel injection in accordance with the determined degree of accelerator opening, and outputs a control signal depending on the amount of fuel injection to a fuel injector of the engine of the vehicle 10. Alternatively, the vehicle control unit 36 outputs a control signal depending on the determined amount of braking to the brake of the vehicle 10.

When the vehicle 10 changes its course in order to travel along the trajectory to be traveled, the vehicle control unit 36 determines the steering angle of the vehicle 10 in accordance with the trajectory to be traveled, and outputs a control signal depending on the steering angle to an actuator (not illustrated) controlling the steering wheel of the vehicle 10.

FIG. 10 is an operation flowchart of the vehicle control process that includes the inclination detecting process and is performed by the processor 23. Every time receiving an image from the camera 2, the processor 23 performs the vehicle control process in accordance with the operation flowchart illustrated in FIG. 10. In the following operation flowchart, the process of steps S101 to S105 corresponds to the inclination detecting process.

The object detecting unit 31 of the processor 23 inputs the latest image obtained from the camera 2 into the first classifier to detect detection targets represented in the image. More specifically, the object detecting unit 31 detects rectangular object regions including detection targets in the image (step S101). In addition, the object detecting unit 31 identifies the types of the detected objects, and enters the detected objects in the detected-object list.

The characteristic-region defining unit 32 of the processor 23 rotates an object region including a two-wheeler that is a detection target detected from the latest image by predetermined different angles relative to the original image to define characteristic regions, and cuts out the characteristic regions from the image (step S102). In addition, the characteristic-region defining unit 32 resizes each of the characteristic regions to a predetermined size (step S103).

Regarding the two-wheeler that is a detection target detected from the latest image, the inclination detecting unit 33 of the processor 23 inputs input data including individual pixel values of the resized characteristic regions into the second classifier to detect the positions of the left and right ends of the two-wheeler for each of the characteristic regions (step S104). The inclination detecting unit 33 then determines the width of the two-wheeler from the positions of the left and right ends of the two-wheeler for each of the characteristic regions, and detects, as the inclination angle of the two-wheeler, that rotation angle of a characteristic region relative to the original image which minimizes the width (step S105). As in the above-described modified example, the inclination detecting unit 33 may construct a fitted curve representing change in the width of the two-wheeler as a function of change in the rotation angle, based on pairs formed by the widths of the two-wheeler in the respective characteristic regions and the rotation angles of the corresponding characteristic regions relative to the original image, and detect a rotation angle that minimizes the width of the two-wheeler in the fitted curve as the inclination angle of the two-wheeler.

For each of the object regions including the detection targets in the latest image, the tracking unit 34 of the processor 23 tracks the detection target represented in the object region of the latest image, based on this object region and the object regions in the past images (step S106).

The driving planning unit 35 of the processor 23 refers to the detected-object list to generate a trajectory to be traveled of the vehicle 10 so that, for each of the detection targets entered in the detected-object list, the trajectory to be traveled will be separated more than a predetermined distance from the predicted trajectory of the detection target determined from the tracking result of the detection target (step S107). When the detection target is a two-wheeler, the driving planning unit 35 uses the inclination angle of the two-wheeler for determining the predicted trajectory as described above. The vehicle control unit 36 of the processor 23 then controls the vehicle 10 so that the vehicle 10 will travel along the trajectory to be traveled (step S108). The processor 23 then terminates the vehicle control process.

As has been described above, the apparatus for detecting an inclination angle inputs an image into a first classifier that has been trained to detect a two-wheeler, thereby detecting an object region including a two-wheeler represented in the image. The apparatus then rotates the object region by predetermined angles to define characteristic regions as respective rotated regions, and cuts out the characteristic regions from the image. The apparatus then resizes each of the characteristic regions to a predetermined size, and inputs input data including individual pixel values of the characteristic regions into a second classifier to determine the widths of the two-wheeler in the respective characteristic region. The apparatus then detects, as the inclination angle of the two-wheeler, that rotation angle of a characteristic region which minimizes the width of the two-wheeler. In particular, the apparatus uses, as the second classifier, a classifier that has been trained to detect the positions of the left and right ends of the two-wheeler in each of the resized characteristic regions, which allows for correctly detecting the widths of the two-wheeler in the respective characteristic regions. The width of the two-wheeler in each of the characteristic regions changes as a function of the inclination angle of the two-wheeler to the bottom of the characteristic region, and that rotation angle of a characteristic region relative to the original image which minimizes the width of the two-wheeler is substantially equal to the inclination angle of the two-wheeler to the ground. For this reason, the apparatus can correctly detect the inclination angle of a two-wheeler by determining the inclination angle from that rotation angle of a characteristic region relative to the original image which minimizes the width of the two-wheeler.

With reference to FIG. 5 again, it is assumed that the larger the angle formed between the bottom of a characteristic region and the center-line direction of a two-wheeler, the larger the height of the two-wheeler in the vertical direction of the characteristic region (i.e., in the direction perpendicular to the bottom of the characteristic region). Thus, according to a modified example, the inclination detecting unit 33 may detect the height of the two-wheeler from the positions of the top and bottom of the two-wheeler for each of the characteristic regions, and detect, as the inclination angle of the two-wheeler, that rotation angle of a characteristic region relative to the original image which maximizes the height. In this case, as in the above-described embodiment, the inclination detecting unit 33 may input input data including individual pixel values of the resized characteristic regions into a second classifier that has been trained to detect the positions of the top and bottom of a two-wheeler, thereby detecting, for each of the characteristic regions, the positions of the top and bottom of the two-wheeler represented in the characteristic region.

According to another modified example, the object detecting unit 31 may use a classifier other than a DNN, to detect a detection target from an image. For example, the object detecting unit 31 may use, as the first classifier, a support vector machine (SVM) that has been trained to output a confidence score indicating how likely a target object for detection is to be represented in a window defined on an image, in response to input of features (e.g., HOG) calculated with respect to the window. The object detecting unit 31 calculates the features with respect to a window defined on an image while variously changing the position, size, and aspect ratio of the window, and inputs the calculated features into the SVM to obtain the confidence score for the window. Then, the object detecting unit 31 may determine that a window for which the confidence score of a certain type of detection target is not less than a predetermined confidence-score threshold shows the detection target, and regard this window as an object region. The SVM may be prepared for each type of target object for detection. In this case, the object detecting unit 31 may input, for each window, the features calculated from the window into the SVMs to calculate the confidence scores for the respective types of objects.

According to still another modified example, the input data to be inputted into the second classifier may include those features of the feature maps outputted from the main part of the first classifier used by the object detecting unit 31 which correspond to the positions of individual pixels of the resized characteristic regions.

The apparatus for detecting an inclination angle according to the embodiment or modified examples may be mounted on a device other than vehicle-mounted equipment. For example, the apparatus according to the embodiment or modified examples may be configured to detect a two-wheeler from an image generated by a surveillance camera placed for taking a picture of a predetermined outdoor region every predetermined period and to detect the inclination angle of the detected two-wheeler.

A computer program for achieving the functions of the units of the processor 23 of the apparatus according to the embodiment or modified examples may be provided in a form recorded on a computer-readable and portable medium, such as a semiconductor memory, a magnetic recording medium, or an optical recording medium.

As described above, those skilled in the art may make various modifications according to embodiments within the scope of the present invention.

What is claimed is:

1. An apparatus for detecting an inclination angle comprising:
a processor configured to:
input an image generated by a camera into a first classifier that has been trained to detect a two-wheeler, thereby detecting an object region including the two-wheeler in the image;
rotate the object region by a plurality of predetermined different angles to define a plurality of characteristic regions as respective rotated regions;
cut out the characteristic regions from the image;
detect an image width of the two-wheeler in each of the characteristic regions;
detect a rotation angle relative to the image as the inclination angle of the two-wheeler to the normal of the ground, based on rotation angles of the respective characteristic regions relative to the image and image widths of the two-wheeler in the respective characteristic regions, the rotation angle minimizing the image width of the two-wheeler; and
control travel of a vehicle based on the detected rotation angle;
wherein the processor is further configured to resize each of the characteristic regions to a predetermined size and input the resized characteristic regions into a second classifier to determine the positions of the left and right ends of the two-wheeler in each of the characteristic regions, and determine, for each of the characteristic regions, the difference between the positions of the left and right ends in the characteristic region as the image width of the two-wheeler in the characteristic region, the second classifier having been trained to detect the positions of the left and right ends of the two-wheeler.

2. An apparatus for detecting an inclination angle comprising:
a processor configured to:
input an image generated by a camera into a first classifier that has been trained to detect a two-wheeler, thereby detecting an object region including the two-wheeler in the image;
rotate the object region by a plurality of predetermined different angles to define a plurality of characteristic regions as respective rotated regions;
cut out the characteristic regions from the image;
detect an image width of the two-wheeler in each of the characteristic regions;
detect a rotation angle relative to the image as the inclination angle of the two-wheeler to the normal of the ground, based on rotation angles of the respective characteristic regions relative to the image and image widths of the two-wheeler in the respective characteristic regions, the rotation angle minimizing the image width of the two-wheeler; and
control travel of a vehicle based on the detected rotation angle;
wherein the processor is further configured to perform curve fitting using pairs formed by the image widths of the two-wheeler in the respective characteristic regions and the rotation angles of the corresponding characteristic regions relative to the image to determine a fitted curve representing change in the image width of the two-wheeler as a function of change in the rotation angle, and detect a rotation angle that minimizes the image width of the two-wheeler in the fitted curve to be the inclination angle of the two-wheeler to the normal of the ground.

3. An apparatus for detecting an inclination angle comprising:
a processor configured to:
input an image generated by a camera into a first classifier that has been trained to detect a two-wheeler, thereby detecting an object region including the two-wheeler in the image;
rotate the object region by a plurality of predetermined different angles to define a plurality of characteristic regions as respective rotated regions;
cut out the characteristic regions from the image;
detect an image height and an image width of the two-wheeler in each of the characteristic regions;
detect a rotation angle relative to the image as the inclination angle of the two-wheeler to the normal of the ground, based on rotation angles of the respective characteristic regions relative to the image, the image width of the two-wheeler, and image heights of the two-wheeler in the respective characteristic regions, the rotation angle maximizing the image height of the two-wheeler and minimizing the image width of the two-wheeler;

predict a trajectory on which the two-wheeler will travel, based on the inclination angle;

determine a trajectory to be traveled by a vehicle, based on the predicted trajectory, so that the vehicle will be separated from the two-wheeler more than a predetermined distance; and control travel of the vehicle so that the vehicle will travel along the trajectory to be traveled.

4. A controller for controlling travel of a vehicle, the controller comprising:

a processor configured to:

input an image generated by a camera mounted on the vehicle into a first classifier that has been trained to detect a two-wheeler, thereby detecting an object region including the two-wheeler located nearest the vehicle in the image;

rotate the object region by a plurality of predetermined different angles to define a plurality of characteristic regions as respective rotated regions;

cut out the characteristic regions from the image;

detect an image width of the two-wheeler in each of the characteristic regions and detects a rotation angle relative to the image as the inclination angle of the two-wheeler to the normal of the ground, based on rotation angles of the respective characteristic regions relative to the image and image widths of the two-wheeler in the respective characteristic regions, the rotation angle minimizing the image width of the two-wheeler;

predict a trajectory on which the two-wheeler will travel, based on the inclination angle;

determine a trajectory to be traveled by the vehicle, based on the predicted trajectory, so that the vehicle will be separated from the two-wheeler more than a predetermined distance; and control the vehicle so that the vehicle will travel along the trajectory to be traveled.

\* \* \* \* \*